United States Patent
Nabeiro et al.

(10) Patent No.: US 11,447,329 B2
(45) Date of Patent: Sep. 20, 2022

(54) CAPSULE WITH OPTIMIZED WEAKENED MATERIAL REGION AND SYSTEM FOR PREPARING EDIBLE PRODUCTS INCLUDING SAID CAPSULES

(71) Applicant: NOVADELTA—COMÉRCIO E INDÚSTRIA DE CAFÉS S.A., Lisbon (PT)

(72) Inventors: Rui Miguel Nabeiro, Campo Maior (PT); Joao Andre De Figueiredo Branco, Moscavide (PT); Jesus Medina Mundt, Lisbon (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 515 days.

(21) Appl. No.: 16/468,462

(22) PCT Filed: Dec. 27, 2017

(86) PCT No.: PCT/PT2017/050031
§ 371 (c)(1),
(2) Date: Jun. 11, 2019

(87) PCT Pub. No.: WO2018/124899
PCT Pub. Date: Jul. 5, 2018

(65) Prior Publication Data
US 2020/0087055 A1   Mar. 19, 2020

(30) Foreign Application Priority Data

Dec. 29, 2016 (PT) .......................... 109814

(51) Int. Cl.
*B65D 85/804* (2006.01)
*A47J 31/36* (2006.01)
*A47J 31/40* (2006.01)

(52) U.S. Cl.
CPC ...... *B65D 85/8055* (2020.05); *A47J 31/3628* (2013.01); *A47J 31/407* (2013.01)

(58) Field of Classification Search
None
See application file for complete search history.

(56) References Cited

U.S. PATENT DOCUMENTS

| 5,656,311 A | 8/1997 | Fond |
| 2014/0130678 A1* | 5/2014 | Frydman ............ B65D 85/8043 99/295 |

FOREIGN PATENT DOCUMENTS

| AU | 2015273547 B2 * | 6/2015 | .......... B65D 85/804 |
| EP | 0 521 510 A1 | 1/1993 | |

(Continued)

OTHER PUBLICATIONS

Machine translation of ES 2340611 T3 performed on Mar. 11, 2022, Hiron (Year: 2010).*

(Continued)

*Primary Examiner* — Brian W Jennison
*Assistant Examiner* — Kevin Guanhua Wen
(74) *Attorney, Agent, or Firm* — Sughrue Mion, PLLC

(57) ABSTRACT

A capsule (1) having at least one first construction element (2) configured in a container-like shape, and a second construction element (3) configured in a lid-like shape, adapted so as to contain an individual portion of an edible substance. The second construction element (3) presents a passageway wall (4) provided as a recess region and surrounded in at least most part of respective perimeter by a weakened material region (41) provided as a reduction of thickness in the upstream side and downstream side of said passageway wall (4). The capsule is used with an apparatus for preparing edible products comprising at least one brewing device (10) presenting injection means (13) adapted so that exert a mechanic pressure upon the passageway wall (4)

(Continued)

on a region of the passageway wall (4) opposite to the region of weakened material region (41).

15 Claims, 4 Drawing Sheets

(56) References Cited

FOREIGN PATENT DOCUMENTS

| EP | 2757057 A1 | * | 7/2014 | ......... B65D 85/8043 |
|----|------------|---|--------|------------------------|
| ES | 2340611 T3 | * | 6/2010 | ......... A47J 31/0678 |
| NL | WO 2010128844 A1 | * | 11/2010 | ........... B65D 85/804 |
| WO | 2008/125256 A1 | | 10/2008 | |
| WO | 2012/100976 A1 | | 8/2012 | |
| WO | 2015/002561 A1 | | 1/2015 | |
| WO | 2015/005814 A1 | | 1/2015 | |

OTHER PUBLICATIONS

International Search Report for PCT/PT2017/050031 dated Mar. 29, 2018 (PCT/ISA/210).
Written Opinion for PCT/PT2017/050031 dated Mar. 29, 2018 (PCT/ISA/237).

* cited by examiner

CAPSULE WITH OPTIMIZED WEAKENED MATERIAL REGION AND SYSTEM FOR PREPARING EDIBLE PRODUCTS INCLUDING SAID CAPSULES

This application is a National Stage of International Application No. PCT/PT2017/050031 filed Dec. 27, 2017, claiming priority based on Portuguese Patent Application No. 109814 filed Dec. 29, 2016.

FIELD OF THE INVENTION

The present invention refers to the field of the capsules for preparing edible products including aromatic beverages, such as for example espresso coffee, tea and similar.

The present invention further refers to a system for preparing edible products based upon capsules.

BACKGROUND OF THE INVENTION

The prior art includes several solutions relating to systems for preparing beverages, such as for example machines for preparing beverages including espresso coffee, tea and similar, based upon capsules containing a single portion of edible substance and provided so that are collected inside of a brewing device. Said brewing device is adapted so as to inject a pressurized fluid flow through an upstream side of capsule, and to collect the resulting beverage from a downstream side of capsule.

In particular in the case of capsules provided in a substantially rigid material and construction structure, despite being retained by means of pressured engagement inside of a respective brewing device, this type of capsules can slip a direction transversal to the prevailing flow direction, notably in a rotation movement around its axial axis, in particular in case that the pressurized water injection is not done by means of penetration of the capsule envelope. In fact, in the case of brewing devices with multiple pressurized water injection outlets, there is the need to ensure that a capsule of this type is retained in reliable manner, and eventually positioned on a given angular position, inside of a respective brewing device.

The document EP 2287090 B1 discloses a capsule comprising a container part with a base wall that presents a structure that forms a reduced thickness of entry wall of the pressurized fluid. In particular, said structure forms a continuous annular recess portion of radius R1 where there is provided a plurality of injection holes.

The document EP 2394932 B1 discloses a capsule similar to that of the aforementioned document, whereby in this case there is provided a weakened material region designed such that breaks at least partially under the pressure of a pressurized liquid. Moreover, the body of the capsule is made of plastic or from a plastic based material.

The document EP 2560897 B1 discloses a capsule comprising a container part with a base wall that presents a weakened material zone that defines a wall part that can be broken, and a portion of greater thickness of said base wall around which the wall part that can be broken turns.

The document EP 2757057 A1 discloses a capsule that presents a groove that surrounds a central region that presents at least perforation zone with perforations that provide an entry of hot water into the interior of capsule.

The document WO 2015/002562 A1 submitted by the author of the present application discloses a capsule comprising a lid-like element that presents at least one engagement groove disposed such that is surrounded by, or itself surrounds, a zone of said second construction element adapted for fluid passage.

GENERAL DESCRIPTION OF THE INVENTION

The objective of the present invention is to provide a capsule in a substantially rigid construction, for collection of a single portion of an edible substance, in particular adapted for preparing edible products, including beverages, inside of a respective brewing device, and that provides sufficient oxygen barrier and a reliable opening to pressurized flow through a respective upstream oriented wall and presenting a weakened material region.

In particular, this objective is attained by means of a capsule that presents a lid-like construction element, presenting a wall part and a flow passageway wall provided as a recess region of circular shape in the central region of said wall part and presenting a smaller wall thickness, whereby said passageway wall is delimited along at least part of a circumferential alignment by a weakened material region adapted so that said passageway wall breaks in this zone and swivels around part of said circumferential alignment.

The capsule according to the invention comprises a first construction element configured in a container-like form, and a second construction element configured in a lid-like form and adapted for entry of a pressurized fluid preferentially without holing of a respective exterior envelope, and adapted for joint assembly so as to provide an interior volume for collection of a portion of at least one edible substance, including coffee, tea and similar.

It is preferred when the upstream oriented surface of capsule presents a recess region surrounding the passageway wall and an intercalary region between these.

It is preferred when said recess region develops from a second circumferential alignment in the proximity of said passageway wall and so that results an intercalary region between said recess region and said passageway wall, whereby said recess region presents a recess wall thickness ($e_5$) that is smaller than the prevailing wall thickness ($e_{31}$), and bigger than the passageway wall thickness ($e_4$) of said passageway wall, so that structurally reinforces the surrounding region of said passageway wall and provides retention surfaces for an engagement element provided on said brewing device.

It is preferred when at least most part, preferentially the totality, of recess wall thickness ($e_5$) of said recess region develops between transversal planes in the proximity downstream of the transversal planes that delimit the passageway wall thickness ($e_4$) of said passageway wall, so that at least most part of said recess wall thickness ($e_5$) is provided downstream of said passageway wall thickness ($e_4$).

It is preferred when said passageway wall is delimited by a first circumferential alignment that presents a first diameter ($d_1$) smaller than 0.35 times the diameter (d) of said flow entry wall part.

It is preferred when said recess region is delimited on a respective distal side by a circumferential alignment presenting a second diameter ($d_2$), whereby said second diameter ($d_2$) is at least 1.2 times bigger, preferentially at least 1.4 times bigger, and at most 2.5 times bigger, preferentially at most 2 times bigger than said first diameter ($d_1$).

It is preferred when the radial extension of said recess region is at least approximately similar, preferentially bigger than 0.8 times and smaller than 1.2 times the radial extension of said intercalary region.

It is preferred when said recess region presents a substantially polygonal transversal section defining at least three interior surfaces, preferentially five interior surfaces, and presenting a depth between 1 and 3 mm, preferentially between 1.5 and 2.5 mm, relative to the exterior surface of said second construction element, and a radial dimension between 1 and 3 mm, preferentially between 1.5 and 2.5 mm.

It is preferred when said intercalary region presents an intercalary wall thickness ($e_6$) that is bigger than the passageway wall thickness ($e_4$) of said passageway wall and bigger than the recess wall thickness ($e_5$) of said recess region, preferentially is at least approximately similar to said prevailing wall thickness ($e_{31}$), thereby structurally reinforcing the region surrounding said weakened material region and providing a support surface to a sealing element provided on said brewing device.

It is preferred when said intercalary region presents an intercalary wall thickness ($e_6$) that develops between planes transversal to the axial direction upstream and downstream of the transversal planes that delimit said passageway wall thickness ($e_4$) and recess wall thickness ($e_5$).

It is preferred when said intercalary region comprises a seat region that develops in the upstream oriented surface of said flow entry wall part along at least most part of the radial extension between said passageway wall and said recess region, whereby said seat region is adapted so that provides a seat surface to a sealing element provided on said brewing device.

It is preferred when said seat region presents a seat wall thickness ($e_{61}$) that is bigger than the passageway wall thickness ($e_4$) of said passageway wall, thereby improving the opening of said weakened material region as impinged by an upstream pressurized flow.

It is preferred when said seat region presents a seat wall thickness ($e_{61}$) that is bigger than the recess wall thickness ($e_5$) of said recess region, preferentially presents a wall thickness that is at least approximately similar to said prevailing wall thickness ($e_{31}$).

It is preferred when said intercalary region presents a guiding projection along said first circumferential alignment so that delimits said seat region relative to said passageway wall, whereby said guiding projection projects beyond the upstream oriented exterior surface of said flow entry wall part, so that provides a conduction surface that is adjacent and substantially orthogonal or oblique relative to the surface provided by said seat region.

It is preferred when said passageway wall presents a projection element that develops upstream, whereby said projection element develops along an extension beyond the plane defined the upstream oriented surface of said flow entry wall part, so that can be impinged by a flow injection part of said brewing device.

It is preferred when said projection element is provided only on one side of said passageway wall relative to said axial axis (X), preferentially in the proximity of perimeter of said passageway wall.

It is preferred when said projection element develops along an extension comprised between 10 to 40°, preferentially between 15 and 35°, of the circumferential alignment that develops in at least approximately parallel manner relative to the circumferential alignment defined by the exterior limit of said passageway wall.

It is preferred when said projection element is provided in the proximity of the perimeter and on the side that develops in the weakened material region presenting a smaller thickness.

Another objective of the present invention is to provide a system for preparing edible products based upon capsules, presenting capsules and a brewing device adapted so as to improve the entry of flow into said capsules, in particular opening of a passageway wall presenting a weakened material region.

An associated objective is to disclose a system that provides an improved concentration of pressurized flow on a passageway wall presenting a weakened material region It is preferred when said upstream actuation part presents an engagement element provided as a protuberance that develops at a distance from said injection means and adapted so that engages on said recess region provided on said flow entry wall part, so as to thereby retain said capsule with relation to a sealing element provided so that surrounds said injection means.

It is preferred when said engagement element is provided so that develops along an extension of arch of circumference that is smaller than 20°, preferentially smaller than 15°, and bigger than 3°, preferentially bigger than 5°.

It is preferred when said sealing element is provided with a ring shape and adapted so that sits on the seat region of said intercalary region between said passageway wall and recess region.

It is preferred when said sealing element is provided as a projection that develops along the axial direction with a smaller extension than the extension of said engagement element.

DESCRIPTION OF THE FIGURES

The present invention shall be hereinafter explained in greater detail based upon the description of preferred embodiments thereof and the Figures attached.

The Figures show, in simplified schematic representations.

DETAILED DESCRIPTION OF THE INVENTION

Figure 1:
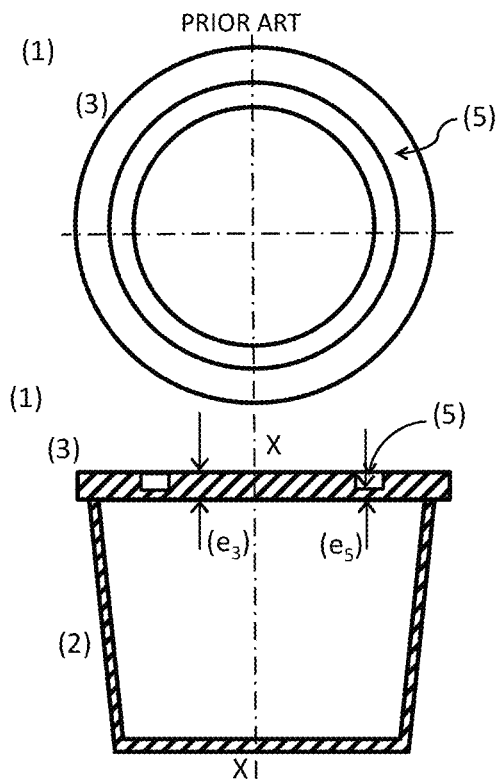
FIG. 1: plan view (top) and side cut (bottom) of a capsule (1) according to prior art.

As can be observed in FIG. 1, a capsule of the type of capsule (1) includes a first construction element (2) configured in a container-like shape and a second construction element (3) configured in a lid-like shape. Said first and second construction elements (2, 3) are provided as substantially rigid, for example in a plastic material, and adapted for joint assembly along a common central axis (X) of said capsule (1), thereby providing an interior volume adapted for collection of a single portion of at least one edible substance, such as for example roasted ground coffee beans.

Optionally, there can be provided a recess region (5) on the upstream-oriented side, of annular shape and eventually presenting a weakened material region.

Figure 2:
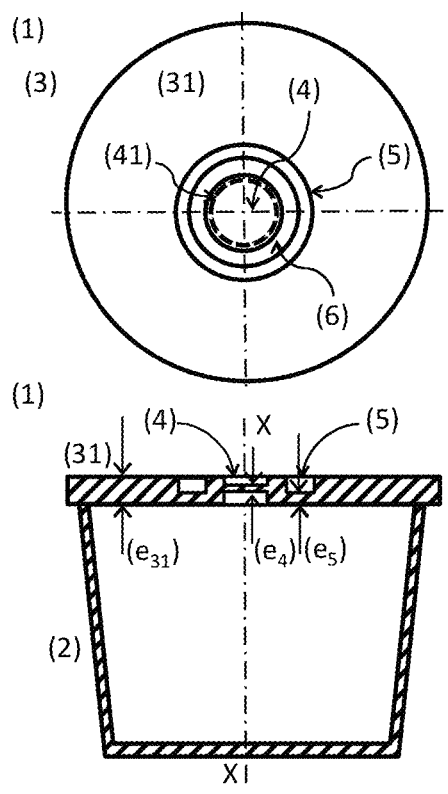
FIG. 2: plan view (top) and side cut (bottom) of a capsule (1) according to present invention.

As can be observed in FIG. 2, in the case of a capsule (1) according to the present invention, a second construction element (3) presents a top entry wall part (31) that presents a disk-like general shape and a passageway bottom wall (4) that is provided in a region having a passageway side wall that is recessed relative to the exterior surface planes of said entry wall part (31).

In the case of a first embodiment of said capsule (1), said passageway wall (4) presents a passageway wall thickness ($e_4$) that corresponds to a reduction of thickness of the prevailing wall thickness ($e_{31}$) of said entry wall part (31), provided in a region of circular shape and on both sides of said entry wall part (31), so that said passageway wall (4) develops in a intercalary plane between the exterior surfaces oriented upstream and downstream of said entry wall part (31). Moreover, it is preferred when at least the downstream surrounding walls, preferentially also the upstream surrounding walls of said passageway wall (4), develop along an oblique direction relative to the direction of said axial axis (X).

Said passageway wall part (4) presents a weakened material region (41) that develops along at least most part of said first circumferential alignment and that is adapted so that breaks under a given upstream pressure.

Figure 6:
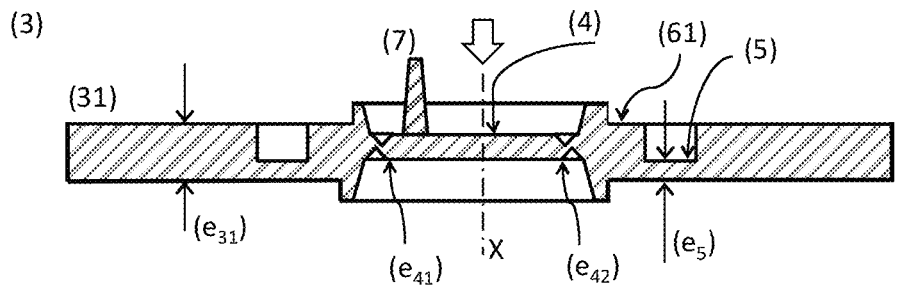
FIG. 6: side cut view (top) and respective detail of central region (bottom) of second construction element (3) according to FIG. 5.
Figure 6:
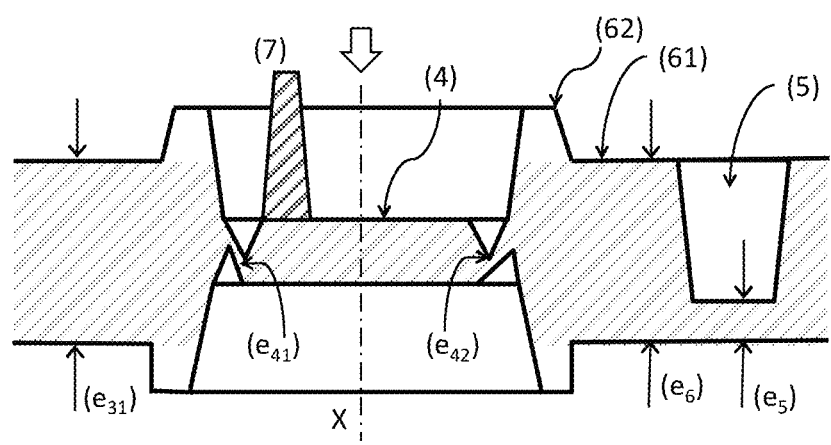

The second construction element (3) of said capsule (1) further presents a recess region (5) provided on the upstream oriented side of said entry wall part (31), whereby said recess region (5) develops from a second circumferential alignment in the proximity of said passageway wall (4) and so that results an intercalary region (6) between said recess region (5) and said passageway wall (4). The intercalary region (6) may comprise two planar regions (61, 62) of different thicknesses, as illustrated in FIG. 6. The recess region (5) presents a recess wall thickness ($e_5$) that is smaller than the prevailing wall thickness ($e_{31}$), and bigger than the passageway wall thickness ($e_4$) of said passageway wall (4), so that said passageway wall (4) is deflected under the pressurized flow so that breaks said weakened material region (41).

The second construction element (3) of said capsule (1) further presents an intercalary region (6) that presents an intercalary wall thickness ($e_6$) that is bigger than the passageway wall thickness ($e_4$) of said passageway wall (4) and bigger than the recess wall thickness ($e_5$) of said recess region (5), preferentially is at least approximately similar to said prevailing wall thickness ($e_{31}$), thereby improving the transmission of structural resistance from said recess region (5) and to said weakened material region (41).

Figure 3:
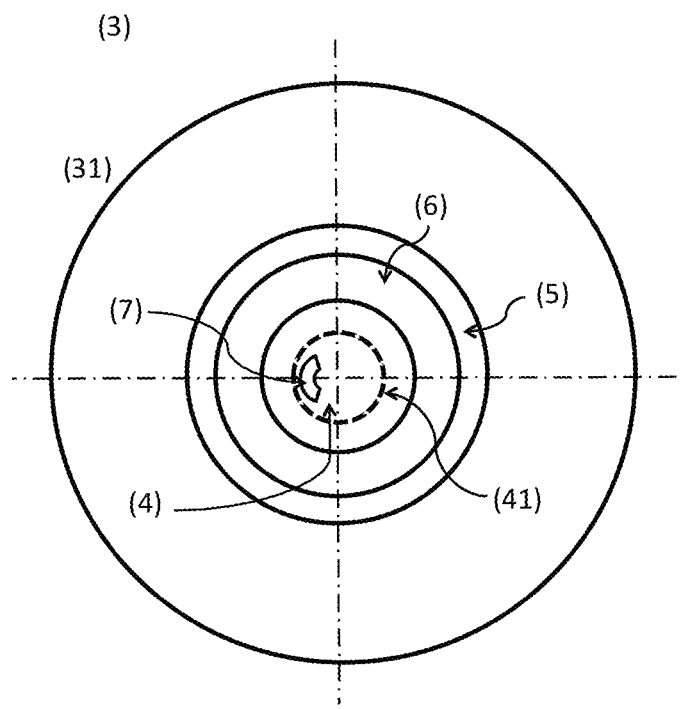
FIG. 3: plan view of a first embodiment of a second construction element (3) in a capsule (1) according to the invention.
Figure 4:
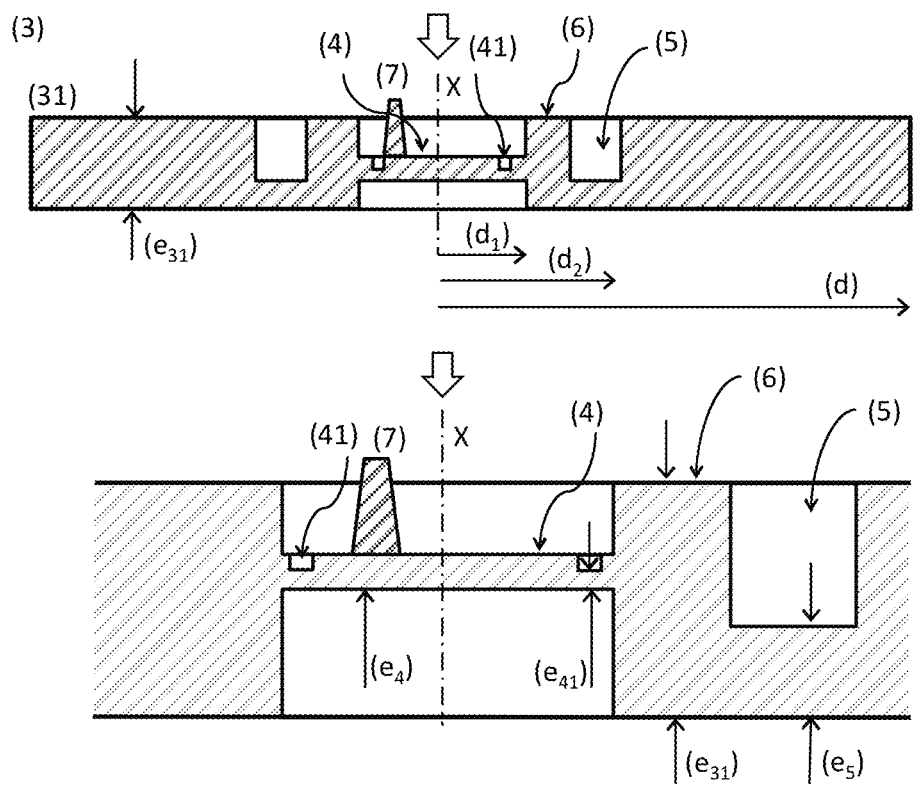
FIG. 4: side cut view (top) and respective detail of central region (bottom) of second construction element (3) according to FIG. 3.

According to an inventive aspect of a capsule (1) according to the present invention, said passageway wall (4) presents a passageway wall thickness ($e_4$) that is smaller than said prevailing wall thickness ($e_{31}$), and respective weakened material region (41) is provided by means of localized reduction of said passageway wall thickness ($e_4$), so that results a region of weakened thickness ($e_{41}$) along said first circumferential alignment, thereby improving the opening of said passageway wall (4) when impinged by an upstream pressurized flow—see FIGS. 3 and 4.

Moreover, said passageway wall (4) is provided as a reduction of said prevailing wall thickness ($e_{31}$) in a region of circular shape and centred relative to the centre (X) of said entry wall part (31), and said weakened material region (41) is provided between said prevailing wall thickness ($e_{31}$) and said passageway wall thickness ($e_4$).

According to an inventive aspect, said flow passageway wall (4) presents a projection element (7) that extends upstream, whereby said projection element (7) develops along an extension beyond the plane defined by the upstream oriented surface of said entry wall part (31), so that said projection element (7) can be impinged by a flow injection part (13) of said brewing device (10) as the latter moves in the closing movement, and thereby generates a deflection moment upon said weakened material region ($e_{41}$)—see FIGS. 3 to 6.

It is thus provided an additional element of mechanic pressure upon the weakened material region (41) of said passageway wall (4), thereby contributing to a reliable opening thereof.

It is preferred when said projection element (7) is provided only on one side of said flow passageway wall (4) relative to said axial axis (X), preferentially in the proximity of perimeter of said flow passageway wall (4).

It is further preferred when said projection element (7) develops along an angular extension comprised between 10 to 40°, preferentially between 15 to 35°, of a circumferential alignment that develops in at least approximately manner relative to the circumferential alignment defined by the exterior limit of said passageway wall (4).

It is further preferred when said projection element (7) is provided in the proximity of perimeter and on one side where develops said weakened material region (41) presenting a smaller wall thickness.

According to a preferred embodiment—see FIGS. 3 and 4, and 5 and 6—, it is preferred when said passageway wall (4) presents a passageway wall thickness ($e_4$) that corresponds to a thickness reduction of prevailing wall thickness ($e_{31}$) of said flow entry wall part (31), provided in a region of circular shape and on both side of said flow entry wall part (31), so that said passageway wall (4) develops in an intercalary plane between upstream and downstream oriented exterior surfaces of said flow entry wall part (31).

It is further preferred when said passageway wall (4) is provided closer to the upstream oriented surface than from the downstream oriented surface of said flow entry wall part (31).

According to another inventive aspect—see FIGS. 3 to 6—said weakened material region (41) is provided as the region between two recesses in opposite sides of said passageway wall (4), whereby said recesses presents at least one of different shape and different dimension relative to the remaining passageway wall (41).

It is preferred when said weakened material region (41) is provided as the region between two recesses in opposite sides of said passageway wall (4), developing along a circumferential alignment of at least approximately similar dimension, whereby said recesses distant from each other in the closest region between each other in the value corresponding to said weakened thickness ($e_{41}$).

It is preferred when said weakened material region (41) is provided as the region between two recesses in opposite sides of said passageway wall (4), whereby said recesses presents different depths relative to the surface planes of the respective sides of said passageway wall (4), and said maximum depths develop in different projections along planes parallel to said axial axis (X).

It is further particularly preferred when said weakened material region (41) is provided as the region between two recesses in opposite sides of said passageway wall (4), whereby the recesses disposed on the upstream side develop at least partially on a more proximal region than the recesses disposed on the upstream oriented side, with reference to said axial axis (x) of said passageway wall (4).

Figure 5:
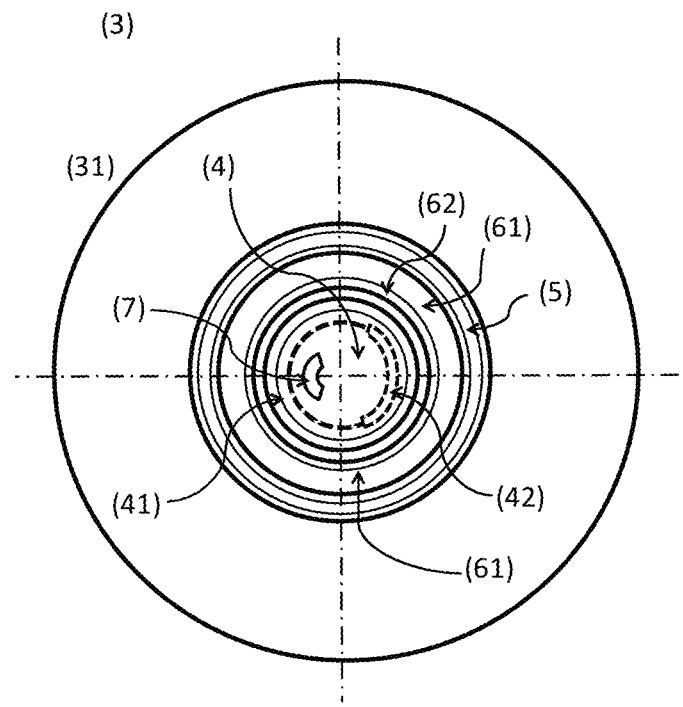
FIG. 5: plan view of a second embodiment of second construction element (3) in a capsule (1) according to the invention.

According to another inventive aspect—see FIGS. 5 and 6—, said weakened material region (41) is provided as the region between two recesses in opposite sides of said passageway wall (4) and presenting at least one oblique surface relative to the direction of said axial axis (X), whereby in the region closest to each other said recesses configure two surfaces oblique relative to the direction of said axial axis (X), and that develop at least approximately parallel along a preferential rupture extension that presents said weakened thickness ($e_{41}$) and develops in oblique manner relative to the direction of said axial axis (X).

It is preferred when said passageway wall (4) is surrounded downstream by a wall that extends beyond the plane defined by the wall thickness ($e_3$) of said flow entry wall part (31) so that deflects the pressurized flow through the weakened material region (41), and in that at least said downstream surrounding wall, preferentially also an upstream surrounding wall of said passageway wall (4), develop along an oblique direction relative to the direction of said axial axis (X).

It is preferred when said weakened material region (41) is provided along at least most part, preferentially the totality, of a circumferential perimeter and presents a first ($e_{41}$) and a second ($e_{42}$) weakened thickness, whereby said first weakened thickness ($e_{41}$) is smaller than said second weakened thickness ($e_{42}$).

It is further preferred when said first weakened thickness ($e_{41}$) develops along a bigger extension than said second weakened thickness ($e_{42}$).

Figure 7:
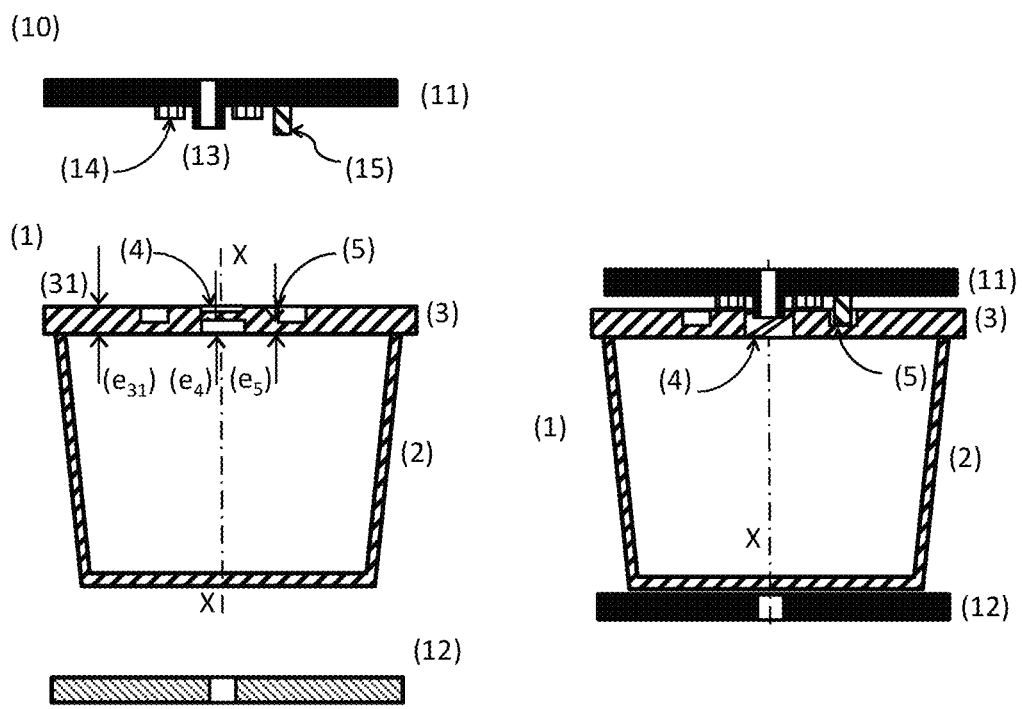
FIG. 7: side cut views of a brewing device (10) open (left-hand side) and closed (right-hand side) and capsule (1) according to the present invention.

FIG. 7 represents a system according to the present invention comprising a capsule (1) adapted for containing an edible substance, for example roasted and ground coffee beans, and a brewing device (10) adapted for being part of an apparatus for preparing edible products, such as for example a coffee machine.

Said brewing device (10) presents an upstream part (11) adapted for injection of pressurized flow, and a downstream part (12) adapted for collection of the resulting edible product.

Figure 8:
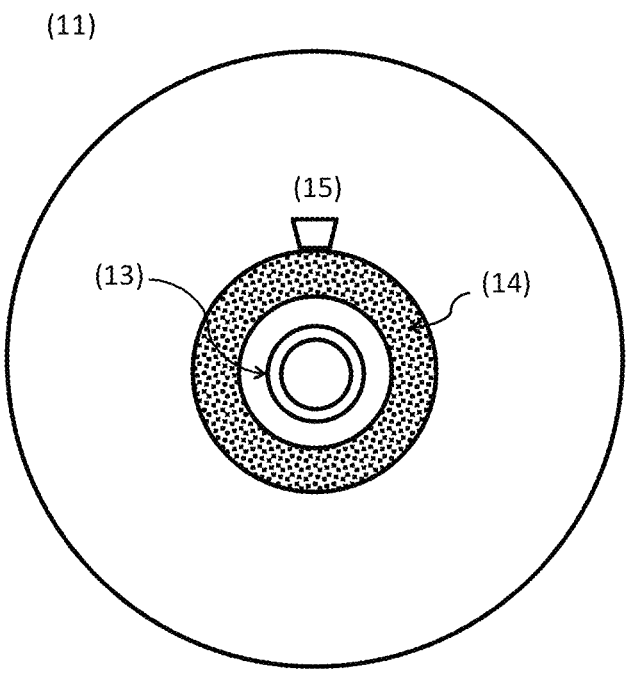
FIG. 8: front view of the upstream actuation part (11) of a brewing device (10) comprised in a system according to the invention.

As one can observe in FIG. 8, the upstream part (11) presents, along the radial direction, injection means (13), a sealing element (14) provided in the proximity of said injection means (13) and further an engagement element (15) provided adjacent to said sealing element (14).

According to an inventive aspect, said injection means (13) are provided as a projection extending downstream and adapted so that exerts a mechanic pressure upon part of said passageway wall (4) in the proximity of the weakened material region (41), so that said passageway wall (4) swivels downstream around a region of said passageway wall (4) that is opposite to said weakened material region (41) as a result of said mechanic pressure—see drawing on the right-hand side of FIG. 7.

Moreover, said injection means (13) are provided as a projection adapted so that at least part, preferentially at least most part of respective extension of projection develops inside of the recess formed by said passageway wall (4) on said flow entry wall part (31), when the brewing device (10) is in a closed position.

It is preferred when said injection means (13) are provided as a projection adapted so that exerts a mechanic pressure, preferentially in asymmetric manner, upon part of said passageway wall (4).

It is further preferred when said injection means (13) are provided as a projection adapted so that exerts a mechanic pressure upon a projection element (7) provided so that extends upstream above and higher than said passageway wall (4)—see FIGS. 3 to 6.

The invention claimed is:

1. A capsule (1) for preparing an edible product on a brewing device (10), said capsule having an axial axis (X) defining an axial direction and being round in cross section to said axial axis (X), the capsule comprising:
    a first construction element (2) configured as a container with a side wall, a closed bottom wall and an open top, and comprising an interior collection volume for holding a single portion of an edible substance, and
    a second construction element (3) configured as a lid that is structured to sealingly cover said open top and thereby confine said interior collection volume of said first construction element (2), and to provide an entry flow passageway to the interior collection volume of said first construction element (2),
    wherein said second construction element (3) comprises a flow entry wall part (31) that has a disk shape with an upstream surface, a downstream surface, and a prevailing wall thickness (e31) between two planes that are on a respective one of the upstream and downstream surfaces and are transverse to the axial axis (X) of said capsule (1) when covering the open top of the first construction element (2),
    wherein said flow entry wall part (31) comprises a rigid material and has a passageway provided with a circular shape, a passageway bottom wall (4) having an upstream oriented side and a downstream oriented side in the axial direction, and a passageway side wall disposed centered relative to the axial axis (X) of said capsule (1),
    wherein said passageway bottom wall (4) comprises a weakened material region (41) formed circumferentially within said passageway bottom wall (4) and adapted to break under a given upstream flow pressure,
    wherein said weakened material region (41) corresponds to a region between a first recess provided on the upstream oriented side of said passageway bottom wall (4), and a second recess provided on the downstream oriented side of said passageway bottom wall (4), and
    wherein each one of said recesses is formed circumferentially along a transversal direction from said axial axis (X) and extends into said passageway bottom wall (4) in said axial direction so that a distance between said recesses, in the nearest region between themselves, is a value corresponding to a weakened thickness ($e_{41}$).

2. The capsule (1) according to claim 1,
    wherein said weakened material region (41) is provided as a region between two recesses in mutually opposing sides of said passageway bottom wall (4), whereby said recesses present at least one of different shape and different dimension.

3. The capsule (1) according to claim 1,
    wherein said weakened material region (41) is provided as the region extending between two recesses on said passageway bottom wall (4) that present different maximum depths relative to the surface planes of respective sides of said passageway wall (4).

4. The capsule (1) according to claim 1,
wherein said weakened material region (41) is provided as the region extending between two recesses on said passageway bottom wall (4) that present maximum depths that develop in different planes parallel to said axial axis (X) of said capsule (1).

5. The capsule (1) according to claim 1,
wherein said weakened material region (41) is provided as the region between two recesses disposed in opposing sides of said passageway bottom wall (4) and presenting at least one oblique surface relative to the direction of said axial axis (X) of said capsule (1),
wherein in the region closer to each other said recesses each comprise two oblique surfaces relative to the direction of said axial axis (X) of said capsule (1), and
wherein said oblique surfaces develop at least approximately parallel along a rupture extension that presents said weakened thickness ($e_{41}$) and that develops in an oblique manner relative to the direction of said axial axis (X) of said capsule (1).

6. The capsule (1) according to claim 1,
wherein said weakened material region (41) is provided as the region between two recesses on opposite sides of said passageway bottom wall (4), whereby recesses disposed on the upstream side develop at least partially in a more proximal region than recesses disposed on the downstream oriented side, with reference to said axial axis (X) of said capsule (1).

7. The capsule (1) according to claim 1,
wherein said passageway bottom wall (4) presents a passageway wall thickness ($e_4$) that is smaller than said prevailing wall thickness ($e_{31}$), and respective weakened material region (41) is provided by means of a localized reduction of said passageway wall thickness ($e_4$), so that results a region with a weakened thickness ($e_{41}$) along said first circumferential alignment, thereby improving the opening of said passageway bottom wall (4) when impinged by a pressurized upstream flow.

8. The capsule (1) according to claim 1,
wherein said passageway bottom wall (4) is provided as a reduction of said prevailing wall thickness ($e_{31}$) on a region of circular shape and centred relative to said entry wall part (31), and
wherein said weakened material region (41) is provided on a region presenting said passageway wall thickness ($e_4$) in the proximity of a region presenting said prevailing wall thickness ($e_{31}$).

9. The capsule (1) according to claim 1,
wherein said passageway bottom wall (4) presents a passageway wall thickness ($e_4$) that corresponds to a reduction of the thickness of the prevailing wall thickness ($e_{31}$) of said entry wall part (31), provided on a region of circular shape and on both sides of said entry wall part (31), so that said passageway bottom wall (4) develop on an intercalary plane between the exterior upstream and downstream oriented surfaces of said entry wall part (31), and
wherein said passageway bottom wall (4) is disposed closer to the upstream oriented surface than to the downstream oriented surface of said entry wall part (31).

10. The capsule (1) according to claim 1,
wherein said passageway bottom wall (4) is surrounded upstream by a side wall that extends beyond the plane defined by the wall thickness ($e_3$) of said entry wall part (31) so that said extended side wall deflects the pressurized flow through the weakened material region (41), and
wherein at least said upstream surrounding wall develop along an oblique region relative to the direction of said axial axis (X).

11. The capsule (1) according to claim 1,
wherein said weakened material region (41) is provided along at least most part, of a circumferential perimeter and presents a first ($e_{41}$) and a second ($e_{42}$) weakened thickness,
whereby said first weakened thickness ($e_{41}$) is smaller than said second weakened thickness ($e_{42}$).

12. The capsule (1) according to claim 1,
wherein said weakened material region (41) presents a first weakened thickness ($e_{41}$) that develops along an arch of circumference comprised between 348° and 325°.

13. The capsule (1) according to claim 1,
wherein said weakened material region (41) presents a first weakened thickness ($e_{41}$) that is between 0.05 and 0.20 times said passageway wall thickness ($e_4$) of said passageway bottom wall (4).

14. The capsule (1) according to claim 1,
further comprising a recess region (5) provided on the upstream oriented side of said entry wall part (31),
whereby said recess region (5) develops from a second circumferential alignment in the proximity of said passageway bottom wall (4) and so that defines an intercalary region (6) between said recess region (5) and said passageway bottom wall (4), and
whereby said recess region (5) presents a recess wall thickness ($e_5$) that is smaller than the prevailing wall thickness ($e_{31}$), and bigger than the passageway wall thickness ($e_4$) of said passageway bottom wall (4), so that said passageway wall (4) is deflected as the pressurized flow breaks said weakened material region (41).

15. A system for preparing edible products comprising:
a capsule (1) according to claim 1, and
an apparatus for preparing edible products based upon said capsule (1) and including at least one brewing device (10) that presents two actuation parts (11, 12),
wherein said actuation parts (11, 12) are adapted so as to collect said capsule (1), and at least one of said actuation parts (11, 12) can be moved relative to the other so as to engage with the exterior envelope of said capsule (1),
wherein an upstream actuation part (11) comprises injection means (13) adapted for impinging a pressurized fluid flow upon said passageway wall (4) provided on an upstream side of said capsule (1),
wherein a downstream actuation part (12) comprises discharge means adapted for collecting a beverage from the downstream side of said capsule (1), and
wherein said injection means (13) are provided as a projection developing downstream and adapted so that exerts a mechanic pressure upon part of said passageway wall (4) in the proximity of said weakened material region (41), provided as the region between two recesses on opposing sides and that present at least one of different shape and different dimension, so that said passageway bottom wall (4) swivels downstream around a region of said passageway bottom wall (4)

opposite to said weakened material region (41) as a result of said mechanic pressure.

\* \* \* \* \*